United States Patent
Segal

(10) Patent No.: US 7,925,163 B2
(45) Date of Patent: Apr. 12, 2011

(54) ASSIGNMENT OF CHANNEL COLORS IN OPTICAL NETWORKS

(75) Inventor: Moshe Segal, Tinton Falls, NJ (US)

(73) Assignee: AT&T Intellectual Property I, L.P., Reno, NV (US)

(*) Notice: Subject to any disclaimer, the term of this patent is extended or adjusted under 35 U.S.C. 154(b) by 9 days.

(21) Appl. No.: 12/381,210

(22) Filed: Mar. 9, 2009

(65) Prior Publication Data
US 2010/0226650 A1 Sep. 9, 2010

(51) Int. Cl.
*H04B 10/00* (2006.01)
(52) U.S. Cl. ............... 398/69; 398/58; 398/79
(58) Field of Classification Search .......... 398/58, 398/66, 25, 69, 79
See application file for complete search history.

(56) References Cited

U.S. PATENT DOCUMENTS

| | | | | |
|---|---|---|---|---|
| 7,558,284 | B2* | 7/2009 | Shinomiya et al. | 370/437 |
| 7,716,271 | B1* | 5/2010 | Bertsekas et al. | 709/200 |
| 2006/0051090 | A1* | 3/2006 | Saniee et al. | 398/59 |
| 2008/0175150 | A1* | 7/2008 | Bolt et al. | 370/235 |
| 2009/0129771 | A1* | 5/2009 | Saniee et al. | 398/3 |

OTHER PUBLICATIONS

Larry A. Coldren, et al.; Tunable Semiconductor Laser; A Tutorial; Journal of Lightwave Technology; vol. 22, No. 1, Jan. 2004.
Cisco Systems; Converge IP and DWDM Layers in the Core Network; 1992-2007.
Alexander Schrijver, et al.; The Ring Loading Problem; SIAM Journal on Discrete Mathematics, 1998.
Shu Huang et al.; Research Problems in Dynamic Traffic Grooming in Optical Networks; Department of Computer Science; 2004.
Arie M.C.A. Koster et al.; Linear Programming Lower Bounds for Minimum Converter Wavelength Assignment in Optical Networks; ZIB Report 04-41 (Dec. 2004).

* cited by examiner

*Primary Examiner* — Agustin Bello

(57) ABSTRACT

A model is provided for optimizing an optical network wherein single links carry multiple signals by using multiple color channels. The routes in the optimized network minimize mid-route color changeovers, reducing the number of nodes requiring optical-electric-optical signal conversion. In the model, the minimized objective function includes terms representing total color miles, terms penalizing changeovers, and terms representing total nodes passed by routes.

19 Claims, 16 Drawing Sheets

100

☐ 1 = NODES

←①→ = LINKS

FIG. 2   200

Lambda.mod
```
/*
An AMPL model for lambda color optimization
Written by Moshe Segal 11/10/06
Further enhancements 01/30/2007, 02/28/2007
*/ param NUMNODES ;  # number of nodes
set NN := 1..NUMNODES ;  # set of nodes
param NODES {n in NN};  # node IDs param NUMLINKS ;  # number of undirected links
param NUMLINKS2 := 2*NUMLINKS;  # number of directed links
set L := 1..NUMLINKS;  # set of links a to z
set L2 := 1..NUMLINKS2;  # set of links a to z and z to a param LO {l in L2};  # links' originating nodes
param LD {l in L2};  # links' destination nodes
param DIST {l in L2};  # distance matrix of link param NUMCOLORS;  # number of colors (wavelengths) assumed
    the same for each link
set CC := 1..NUMCOLORS;  # set of colors param NUMR ;  # number of demand requirements
set R := 1..NUMR;
param RO {r in R};  # set of requirement originating end point
param RD {r in R};  # set of requirement destination end points
param WL {r in R};  # number of wavelength demand
    requirement (in lambda units)
param NUMVIA {n in NN};  # forcing routes via a switch for OEO functionality
param NUMVIACAP {n in NN};  # constraining total WLs via a switch
```

FIG. 2(continued-part1)    200 param MAXHOP ; # max number of hopes allowed on route
param W1; # weight
param W2;
param W3;
param W4;
param W5;

var x{l in L2, r in R},>=0 binary; # =1 if route for demand r uses link l var uu{r in R, l in L2, c in CC}, >=0 binary; # color assignment variable var vv{r in R, c in CC} >=0, integer ; # upper bound variable to force color consistency var zz{c in CC} >=0, integer; # color use indicator var via{n in NN, r in R} >=0;

subject to node_conserve1 {n in NN, r in R : n=RD[r]}:
sum {l in L2, m in NN : n=LO[l] && m=LD[l]} x[l,r]
- sum {l in L2, m in NN : n=LD[l] && m=LO[l]} x[l,r] = -1;

subject to node_conserve2 {n in NN, r in R : n=RO[r]}:
sum {l in L2, m in NN : n=LO[l] && m=LD[l]} x[l,r]
- sum {l in L2, m in NN : n=LD[l] && m=LO[l]} x[l,r] = 1;

subject to node_conserve3 {n in NN, r in R : n <> RO[r] && n <> RD[r]}:
sum {l in L2, m in NN : n=LO[l] && m=LD[l]} x[l,r]
- sum {l in L2, m in NN : n=LD[l] && m=LO[l]} x[l,r] = 0 ;

subject to flowthru {n in NN, r in R : n <> RO[r] && n <> RD[r]}:
sum {l in L2, m in NN : n=LO[l] && m=LD[l]} x[l,r]
+ sum {l in L2, m in NN : n=LD[l] && m=LO[l]} x[l,r] = 2*via[n,r] ;

FIG. 2(continued-part2)   200

```
subject to total_via{n in NN}:
sum {r in R} via[n,r] >= NUMVIA[n];

subject to node_via_cap{n in NN}:
sum {r in R} via[n,r] * WL[r] <= NUMVIACAP[n];

subject to maxhop {r in R}:
sum {l in L2} x[l,r] <= MAXHOP;

# defined for nondirectional links
subject to link_cap {l in L}:
sum {r in R} (x[l,r] +x[l+NUMLINKS,r])*WL[r] <= NUMCOLORS;

# forcing contiguous color
# distinct colors are assigned by u[r,l,c]
# maintaining continuity using vv[,c]

subject to uu_color {l in L2, r in R}:
x[l,r]*WL[r] = sum {c in CC} uu[r,l,c];
subject to vv_color { r in R, l in L2, c in CC}:
uu[r,l,c] <= vv[r,c];

subject to wl_color { l in L , c in CC}:
sum {r in R} (uu[r,l,c]+uu[r,l+NUMLINKS,c]) <=1;

subject to zz_color {r in R, l in L, c in CC}:
uu[r,l,c] <= zz[c];
minimize color_cost:
+ sum { r in R,l in L } W1 * WL[r] * DIST[l] * ( x[l,r] + x[l+NUMLINKS,r])
+ sum { r in R,l in L2, c in CC } W2 * uu[r,l,c]
+ sum { r in R, c in CC } W3 * vv[r,c]
+ sum {n in NN, r in R} W4 * via[n,r]
+ sum { c in CC} W5* zz[c];
```

Lambda.dat

```
/*
An AMPL model for lambda color optimization
Written by Moshe Segal 11/10/06
Further enhancements 01/30/2007, 2/28/2007
*/
data;

# nodes (e.g. CDs) in the network must have integer id (no CLLI)
param NUMNODES := 10;

# note: a physical transport link is represented in the model by two directed
arcs x,y and y,x
# size of link data table is 2*NUMLINKS the first set of NUMLINKS rows are
   data for x,y and
# the second set is for y,x
NUMLINKS is the number of bidirectional links param NUMLINKS := 24;

note: link table has five entries per row:
# link number
# link originating node number
# link terminating node number
link distance param :LO LD DIST :=
1-24 forward and 25-48 backward
1     1     4     250
2     1     10    800
3     1     2     150
4     1     3     360
5     2     4     275
6     2     5     210
7     2     7     420
8     2     3     200
9     3     7     650
10    3     5     290
```

*FIG. 3(continued-part1)*

300

| | | | |
|---|---|---|---|
| 11 | 4 | 9 | 450 |
| 12 | 4 | 5 | 225 |
| 13 | 4 | 6 | 375 |
| 14 | 5 | 9 | 225 |
| 15 | 5 | 8 | 275 |
| 16 | 5 | 7 | 250 |
| 17 | 6 | 7 | 175 |
| 18 | 6 | 8 | 200 |
| 19 | 8 | 10 | 200 |
| 20 | 9 | 8 | 200 |
| 21 | 10 | 9 | 250 |
| 22 | 7 | 9 | 375 |
| 23 | 9 | 3 | 450 |
| 24 | 6 | 10 | 375 |
| 25 | 4 | 1 | 250 |
| 26 | 10 | 1 | 800 |
| 27 | 2 | 1 | 150 |
| 28 | 3 | 1 | 360 |
| 29 | 4 | 2 | 275 |
| 30 | 5 | 2 | 210 |
| 31 | 7 | 2 | 420 |
| 32 | 3 | 2 | 200 |
| 33 | 7 | 3 | 650 |
| 34 | 5 | 3 | 290 |
| 35 | 9 | 4 | 450 |
| 36 | 5 | 4 | 225 |
| 37 | 6 | 4 | 375 |
| 38 | 9 | 5 | 225 |
| 39 | 8 | 5 | 275 |
| 40 | 7 | 5 | 250 |
| 41 | 7 | 6 | 175 |
| 42 | 8 | 6 | 200 |
| 43 | 10 | 8 | 200 |
| 44 | 8 | 9 | 200 |
| 45 | 9 | 10 | 250 |
| 46 | 9 | 7 | 375 |
| 47 | 3 | 9 | 450 |
| 48 | 0 | 6 | 375 ; |

FIG. 3(continued-part2)

```
param NUMCOLORS := 4;
                                              300 number of diverse routes (circuits)
param NUMR := 8 ;

# note: route table has four entries per row:
# route number
# route originating node
# route terminating node
# wavelengths required by route
param:   RO   RD   WL   :=
1        1    10   4
2        10   1    3
3        6    3    4
4        2    8    4
5        9    4    1
6        10   1    3
7        6    3    2
8        2    8    1;

param: NUMVIA NUMVIACAP:=
1        0    100
2        0    100
3        0    100
4        0    100
5        0    100
6        0    100
7        0    100
8        0    100
9        0    100
10       0    100;

param MAXHOP := 6;
param W1 :=1;
param W2 :=1;
param W3 :=1;
param W4 :=1;
param W5 :=1;
```

Lambda.run

```
/*
An AMPL model for lambda color optimization
Written by Moshe Segal 11/10/06
Further enhancements 01/30/2007, 1/28/2007
*/
option solver "/usr/local/bin/cplexamp";
/* option solver "/opt/ampl/cplexamp"; */
option display omit_zero_rows;
model ./lambda.mod;
data ./lambda.dat;
option directive 'mipgap=0.0011';

option cplex_options 'absmipgap=0.1';
solve;
display {l in L2, r in R : x[l,r]>=1} x[l,r];
display {l in L2, r in R : x[l,r]>=1} x[l,r] > ./lambda.out;

display {r in R, l in L2, c in CC : uu[r,l,c] >= 1} uu[r,l,c];
display {r in R, l in L2, c in CC : uu[r,l,c] >= 1} uu[r,l,c] >> ./lambda.out;

display {r in R, c in CC : vv[r,c] >= 1} vv[r,c];
display {r in R, c in CC : vv[r,c] >= 1} vv[r,c] >> ./lambda.out;

display {n in NN, r in R} via[n,r];
display {n in NN, r in R} via[n,r] >> ./lambda.out;

display color_cost;
display color_cost >> ./lambda.out;

display sum {r in R, l in L2, c in CC } uu[r,l,c];
display sum {r in R, l in L2, c in CC } uu[r,l,c] >> ./lambda.out;

display sum{r in R, c in CC } vv[r,c];
display sum{r in R, c in CC } vv[r,c] >> ./lambda.out;

display {c in CC} zz[c];
display {c in CC} zz[c] >> ./lambda.out;
```

Lambda.out

| 2 | 1 | 1 |
| 6 | 4 | 1 |
| 8 | 8 | 1 |
| 15 | 4 | 1 |
| 17 | 3 | 1 |
| 18 | 7 | 1 |
| 20 | 8 | 1 |
| 21 | 2 | 1 |
| 23 | 7 | 1 |
| 25 | 6 | 1 |
| 27 | 2 | 1 |
| 29 | 2 | 1 |
| 34 | 3 | 1 |
| 35 | 2 | 1 |
| 35 | 5 | 1 |
| 37 | 6 | 1 |
| 40 | 3 | 1 |
| 44 | 7 | 1 |
| 47 | 8 | 1 |
| 48 | 6 | 1 |

;

uu[r,l,c] [*,*,1] (tr)

| : | 1 | 2 | 3 | 4 | 7 | := |
|----|----|----|----|----|----|----|
| 2 | 1 | . | . | . | . | |
| 6 | . | . | . | 1 | . | |
| 15 | . | . | . | 1 | . | |
| 17 | . | . | 1 | . | . | |
| 18 | . | . | . | . | 1 | |
| 21 | . | 1 | . | . | . | |
| 23 | . | . | . | . | 1 | |
| 27 | . | 1 | . | . | . | |
| 29 | . | 1 | . | . | . | |
| 34 | . | . | 1 | . | . | |
| 35 | . | 1 | . | . | . | |

FIG. 5(continued-part1)

500

| : | 1 | 2 | 3 | 4 | 6 |
|---|---|---|---|---|---|
| 40 | . | . | 1 | . | . |
| 44 | . | . | . | . | 1 |

[*,*,2]  (tr)

| : | 1 | 2 | 3 | 4 | 6 | := |
|---|---|---|---|---|---|---|
| 2  | 1 | . | . | . | . | |
| 6  | . | . | . | 1 | . | |
| 15 | . | . | . | 1 | . | |
| 17 | . | . | 1 | . | . | |
| 21 | . | 1 | . | . | . | |
| 25 | . | . | . | . | 1 | |
| 27 | . | 1 | . | . | . | |
| 29 | . | 1 | . | . | . | |
| 34 | . | . | 1 | . | . | |
| 35 | . | 1 | . | . | . | |
| 37 | . | . | . | . | 1 | |
| 40 | . | . | 1 | . | . | |
| 48 | . | . | . | . | 1 | |

[*,*,3]  (tr)

| : | 1 | 2 | 3 | 4 | 6 | 7 | := |
|---|---|---|---|---|---|---|---|
| 2  | 1 | . | . | . | . | . | |
| 6  | . | . | . | 1 | . | . | |
| 15 | . | . | . | 1 | . | . | |
| 17 | . | . | 1 | . | . | . | |
| 18 | . | . | . | . | . | 1 | |
| 21 | . | 1 | . | . | . | . | |
| 23 | . | . | . | . | . | 1 | |
| 25 | . | . | . | . | 1 | . | |
| 27 | . | 1 | . | . | . | . | |
| 29 | . | 1 | . | . | . | . | |
| 34 | . | . | 1 | . | . | . | |
| 35 | . | 1 | . | . | . | . | |
| 37 | . | . | . | . | 1 | . | |
| 40 | . | . | 1 | . | . | . | |
| 44 | . | . | . | . | . | 1 | |
| 48 | . | . | . | . | 1 | . | |

FIG. 5(continued-part2)

500

```
[*,*,4]  (tr)
  :     1    3    4    5    6    8    :=
  2     1    .    .    .    .    .
  6     .    .    1    .    .    .
  8     .    .    .    .    .    1
 15     .    .    1    .    .    .
 17     .    1    .    .    .    .
 20     .    .    .    .    .    1
 25     .    .    .    .    1    .
 34     .    1    .    .    .    .
 35     .    .    .    1    .    .
 37     .    .    .    .    1    .
 40     .    1    .    .    .    .
 47     .    .    .    .    .    1
 48     .    .    .    .    1    .
;

vv[r,c]  [*,*]
  :     1    2    3    4    :=
  1     1    1    1    1
  2     1    1    1    .
  3     1    1    1    1
  4     1    1    1    1
  5     .    .    .    1
  6     .    1    1    1
  7     1    .    1    .
  8     .    .    .    1
;
```

*FIG. 5(continued-part3)*

500 via[n,r] [*,*]

| : | 1 | 2 | 3 | 4 | 5 | 6 | 7 | 8 | := |
|---|---|---|---|---|---|---|---|---|---|
| 1 | 0 | 0 | 0 | 0 | 0 | 0 | 0 | 0 | |
| 2 | 0 | 1 | 0 | 0 | 0 | 0 | 0 | 0 | |
| 3 | 0 | 0 | 0 | 0 | 0 | 0 | 0 | 1 | |
| 4 | 0 | 1 | 0 | 0 | 0 | 1 | 0 | 0 | |
| 5 | 0 | 0 | 1 | 1 | 0 | 0 | 0 | 0 | |
| 6 | 0 | 0 | 0 | 0 | 0 | 1 | 0 | 0 | |
| 7 | 0 | 0 | 1 | 0 | 0 | 0 | 0 | 0 | |
| 8 | 0 | 0 | 0 | 0 | 0 | 0 | 1 | 0 | |
| 9 | 0 | 1 | 0 | 0 | 0 | 0 | 1 | 1 | |
| 10 | 0 | 0 | 0 | 0 | 0 | 0 | 0 | 0 | |

;

color_cost = 17468 sum{r in R, l in L2, c in CC} uu[r,l,c] = 55 sum{r in R, c in CC} vv[r,c] = 22 zz[c] [*] :=
1   1
2   1
3   1
4   1
;

700

| 1 | = NODES
----1---- = UNUSED LINKS
←(1)→ = LINKS

ASSIGNMENT OF CHANNEL COLORS IN OPTICAL NETWORKS

FIELD OF THE INVENTION

The present invention relates generally to optical networking, and more particularly, to devices, systems and methods to improving the assignment of colors (wavelengths) on individual optical routes. This is accomplished by the use of an Integer Linear Programming model with the main objective of minimizing color change-over in mid route, thus reducing the need for costly Optical-Electrical-Optical devices which execute color change-over.

BACKGROUND OF THE INVENTION

The use of telecommunications networks and associated Network Access Devices (NADs) has increased dramatically over the last 20 years. We increasingly rely on network accessibility for voice, data and video communication, now integral to personal, government, business, education, health and safety communications.

In communication networks, a node is an active electronic device that is attached to a network, and is capable of sending, receiving, or forwarding information over a communications channel. A node is a connection point, either a redistribution point or a communication endpoint. In network theory, the term node may refer a point in a network topology where data links may intersect or branch.

A data link is the means of connecting one location to another for the purpose of transmitting and receiving digital information. It can also refer to a set of electronic assemblies, consisting of a transmitter and a receiver and the interconnecting data telecommunication circuit. Links are governed by a link protocol enabling digital data to be transferred from a data source to a data destination.

Network topology is the study of the arrangement or mapping of the network elements (links, nodes, etc.) of a network, comprised of the physical (real) and logical (virtual) interconnections between nodes. Local Area Networks (LANs) and Wide Area Networks (WANs) are examples of networks that exhibit both a physical topology and a logical topology. Any given node in a network will have one or more links to one or more other nodes in the network. Mapping of the links and nodes onto a graph results in a geometrical shape that determines the physical topology of the network. Similarly, the mapping of the flow of data between the nodes in the network determines the logical topology of the network. The physical and logical topologies may be identical in any particular network but they also may be different.

High performance and feature-rich communications in a "converged Internet Protocol" environment may in a single service include private intranet, voice, video, Internet, and business partner services. Rapid advances in optical communications technology and devices in terms of performance, reliability and cost over the last decade have enabled the deployment of optically routed Wavelength Division Multiplexing (WDM) networks which can be used to create high capacity nationwide and global broadband networks. In these networks, optical signals can flow end-to-end between users, many times without being converted to electrical signals at the network switches. They can offer large bandwidth, simple cross-connecting of high bit-rate streams, signal format and bit rate independent clear channels, equipment and operational savings, as well as maximum flexibility.

Optical networking provides the inter- and intra-transport capabilities for Access, Metropolitan and Global networks. These networks are composed of nodes and links, as described above. The links correspond to DWDM (Dense Wave Division Multiplexing) systems with multiple optical signals, also called Colors, Wavelengths or Channels. As used herein, color may be used to refer to wavelengths of visible, infrared or ultraviolet light. Multiplexing technology continues to evolve while current methods allow up to 80 discrete colors on a single pair of fibers. Nodes may be equipped with Optical Cross Connect devices where de-multiplexed optical signals are converted from the optical domain to the electronic domain, switched, converted back to the optical domain and multiplexed optically. This Optical-Electrical-Optical (OEO) function serves two purposes: switching and regeneration of the attenuated optical signals. In contrast Optical Switches operate optically so that the OEO function needed for regeneration of the signal and possibly for changing wavelength is performed before and/or after the optical switching function. Essentially, the optical switch serves as an automated optical patch panel. Also at a node, a Reconfigurable Optical Add/Drop Multiplexer (ROADM) in conjunction with transponders may be used to add/drop/switch channels optically.

Links equipped with DWDM systems require optical signal amplification every 100-150 kilometers and optical signal regeneration every 1000-1500 kilometers. With DWDM systems, all the optical signals can be amplified simultaneously, without de-multiplexing, while regeneration must be performed on the de-multiplexed optical signals individually.

It would therefore be desirable to develop a system, device and method to improve the assignment of colors (wavelengths) on individual optical routes. By utilizing an Integer Linear Programming model with the main objective of minimizing color change-over in mid route, the need for costly Optical Cross Connect devices known as Optical-Electrical-Optical devices can be significantly reduced. To the inventors' knowledge, no such system or method currently exists.

SUMMARY OF THE INVENTION

In accordance with one aspect of the present invention, a method is provided for assigning colors to wavelength demands for transmitting multiple optical signals in an optical network between originating nodes and terminating nodes. The optical network comprises a plurality of nodes interconnected by a plurality of links, the links each being capable of transmitting a respective predetermined maximum number of separate optical signals using separate colors. A mathematical model is formulated representing the optical network and the wavelength demands. An objective function of the model is minimized, the objective function representing a total cost of the optical network as a function of the assignment of colors. The objective function includes a sum of at leat the following quantities: a weighted summation of distances transmitted in each color in the network; a weighted count of each color in each link in each route, and a weighted count of each color in each route, whereby color changeovers on routes are penalized; and a weighted count of nodes traversed by each route, whereby routes with larger numbers of nodes are penalized. Colors are assigned to the wavelength demands whereby the objective function is minimized.

In the method, a mathematical model is formulated representing the optical network and the WL demands. An objective function of the model is minimized, the objective function representing a total cost of the optical network as a function of the assignment of colors. The objective function includes a sum of at least the following quantities: a weighted summation of distances transmitted in each color in the network; a weighted count of each color in each link in each route, and a weighted count of each color in each route, whereby color changeovers on routes are penalized; and a weighted count of nodes traversed by each route, whereby routes with larger numbers of nodes are penalized. Colors are assigned to the WL demands whereby the objective function is minimized.

Another embodiment of the invention is a computer-usable medium having computer readable instructions stored thereon for execution by a processor to perform a method for identifying color channels for assignment to multiple optical signals in an optical network. The signals are transmitted over required routes between originating nodes and terminating nodes. The optical network comprises a plurality of nodes interconnected by a plurality of links, the links each being capable of transmitting a respective predetermined maximum number of separate optical signals on separate color channels.

The method comprises formulating a mathematical model representing the optical network and the required routes; and minimizing an objective function of the model, the objective function representing a total cost of the optical network as a function of the assignment of color channels, the objective function including a sum of at least the following quantities: a weighted summation of distances transmitted in each color channel in the network; a weighted count of each color in each link in each route, and a weighted count of each color in each route, whereby color changeovers on routes are penalized; and a weighted count of nodes traversed by each route, whereby routes with larger numbers of nodes are penalized. Color channels are identified for assignment to the multiple optical signals such that the objective function is minimized.

In yet another embodiment of the invention, a method is provided for transmitting multiple optical signals over separate color channels in an optical network to satisfy transmission demands between originating nodes and terminating nodes. The optical network comprises a plurality of nodes interconnected by a plurality of links, each of the links being capable of transmitting a respective predetermined maximum number of separate color channels.

The method comprises the steps of partitioning the nodes into geographic clusters whereby all inter-cluster routes have a length less than a maximum regeneration distance; selecting at least one node in each cluster to contain optical cross connect devices having optical-electric-optical converters (OEOs); and routing longer intra-cluster demands via the selected OEO nodes, while ignoring the predetermined maximum number of separate color channels. For each cluster, a mathematical model is formulated representing the optical network, the model further representing all intra-cluster demands and those portions of inter-cluster demands from their source nodes to an OEO node.

An objective function of the model is minimized, the objective function representing a total cost of the optical network as a function of the assignment of color channels. Color channels are assigned according to the minimized objective function; and color channels are assigned to all leftover inter-cluster portions of the demands between their respective OEO nodes.

These aspects of the invention and further advantages thereof will become apparent to those skilled in the art as the present invention is described with particular reference to the accompanying drawings.

BRIEF DESCRIPTION OF THE DRAWINGS

FIG. 2 shows an exemplary AMPL model, Lambda.mod, to optimize the network of FIG. 1 in accordance with the present invention;

FIG. 3 shows the data, Lambda.dat, and demands for the exemplary AMPL model of FIG. 1 in accordance with the present invention;

FIG. 4 shows the run script, Lambda.run, for the exemplary AMPL model of FIG. 1 in accordance with the present invention;

FIG. 5 shows an output file, Lambda.out, for the exemplary AMPL model of FIG. 1 in accordance with the present invention;

DETAILED DESCRIPTION OF THE INVENTION

Figure 1:
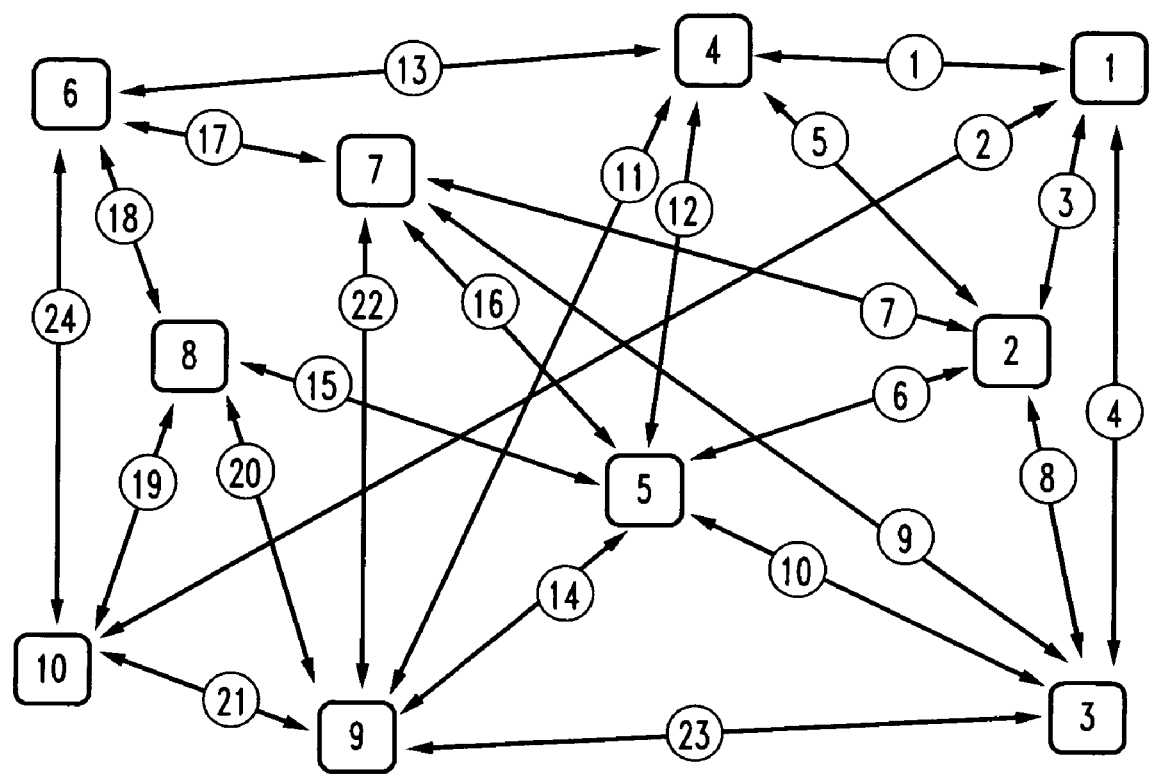
FIG. 1 is a schematic of a network including nodes and links in accordance with an aspect of the present invention.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

The present invention describes an optical communications network optimization model to assign colors to routes carrying optical signal demands (traffic) in order to minimize the need to change colors in mid-route. There are several variants of the model, a 'static' one in which all demands are given input, a 'dynamic' one in which additional demands need assignments without (or minimally) rearranging current assignments, and a 'restoration' one in which a link or some colors on a link fail and the disrupted demands need to be reassigned routes and colors, again without (or minimally) rearranging existing functional assignments. The model provides a basic construct which may be modified by removing irrelevant variables or constraint sets, or extended by building upon the basic model, as needed.

The present invention pertains mainly to modeling optical communications network traffic in an optical mesh network, and has much in common with the problem of finding diverse routes in a network. In this regard, finding link-disjoint routes for demands are considered. These routes are assigned colors but they may cross at nodes where routes intersect, a function provided by an Optical Switch.

A route 'r' is defined by binary variables x[l, r] where the 'l'-s identify the links that the route 'r' traverses. To solve for the values of x[l, r], a special case of the standard single-commodity capacitated network-flow approach in an arc-node formulation is used. A directed link 'l' is represented on a graph as an arc from node 'i' to node 'j'. Associated with a link is a cost per unit flow c[l], (say distance or latency) and a flow variable x[r, l]. Associated with every route 'r', is a source node 'a' with an in-flow of one unit and destination node 'z' with out-flow of one unit. Nodes that are neither a source nor a destination conserve flows. A Linear Programming model that minimizes Σx[l,r]*c[l] subject to conservation of flow equations in an arc-node formulation will result in x[l, r]={0, 1} defining the shortest path for 'r' from 'a' to 'z'. Additionally, constraints will be added to the formulation to accommodate the need to assign colors to each route. Furthermore, variables and constraint sets are added to solve several closely related problems. Finally, weights are then used in the objective function to direct the solution.

FIG. 1 is a schematic 100 of a network comprising nodes and links in accordance with an aspect of the present invention. The network 100 consists of 10 nodes, denoted by numbers within boxes and 24 links, denoted by numbers on bi-directional arrows. The links connect the nodes. For example, bi-directional link number 13 connects node 4 with node 6, and bi-directional link number 5 connects node 2 with node 4.

For modeling purposes each link of FIG. 1 is represented as two uni-directional links, thus the 24 bi-directional links end up represented as 48 unidirectional ones. Bi-directional link 13 is associated with the unidirectional link 13 (and ordered node-pair 4-6) and with the unidirectional link 37 (=13+24) and with the ordered node-pair 6-4. Similarly, unidirectional link 2 is associated with node pair 1-10 and unidirectional link 26 (=2+24) with node pair 10-1. A link corresponds to a DWDM system connecting the pair of nodes.

DWDM systems typically consist of two directional streams of bits on two fibers; however, some systems may use only one fiber for both directions. As related to the model, the two directions associated with each link are required to help determine routes and they do not correspond to the directions of the bits.

The model of the present invention as described with reference to FIG. 1 assumes that all DWDM systems are identical and have identical channel capacity (i.e. have the same number of colors). The model can be extended without departing from the present invention to accommodate DWDMs with a varying number of colors and can accommodate parallel systems between pairs of nodes. Demands are given in units of wavelength between pairs of nodes. The model will determine a route for each demand and assign colors one per unit of demand, subject to availability of colors while minimizing color changeover mid route.

In what follows, the model will be defined using the syntax of AMPL (A Mathematical Programming Language), as is known by those skilled in the art. Other programming languages may be used. First the input data will be defined, followed by the variables, then the set of constraints and finally the objective function.

Data

The number of nodes in the network is defined, together with the set of nodes and their numerical identities.

```
========
param NUMNODES ;                # number of nodes
```

```
set NN := 1..NUMNODES ;         # set of nodes
param NODES {n in NN};          # node IDs
========
```

The data associated with the links are defined in the uni-directional manner described earlier. The first set from 1 to NUMLINKS have a forward direction and the ones from NUMLINKS+1 to 2*NUMLINKS the associated backwards direction. Whenever referring to bidirectional links, the first set only will be used. Thus, link 1 and link 1+NUMLINKS represent the two directions of link 1. Note that the links and their associated data may have the same end-nodes provided they have distinct link numbers; that is, multiple DWDM systems between same pairs of end-nodes must have distinct link numbers in the set L.

```
========
param NUMLINKS ;
param NUMLINKS2 := 2*NUMLINKS;
set L := 1..NUMLINKS;           # set of links a to z
set L2 := 1..NUMLINKS2;         # set of links a to z and z to a
========
```

The next set of data is associated with each directed link. That data includes the identities of its originating node, terminating node and its distance.

The number of allowed colors per link is then defined in L (DWDM) and their identity in the set CC.

```
========
param LO {l in L2};             # links' originating nodes
param LD {l in L2};             # links' destination nodes
param DIST {l in L2};           # distance of each link
param NUMCOLORS;
# number of colors (wavelengths) assumed the same for each link
set CC := 1..NUMCOLORS;         # set of colors
========
```

Data for the requested routes is then specified, including the number of routes, their end-nodes and associated wavelength requirement (in units of wavelength). The model attempts to assign a color to each unit and all colors will follow the same route for a specific demand requirement. Note that one could request several routes with the same end node-pairs. In this case the model will attempt to generate several routes possibly distinct, while minimizing the total distance.

For each node, the minimum number of via routes the node should accommodate and the maximum number of total wavelengths (WLs) the node can accommodate as via capacity are specified. These parameters, as used in the following constraints, provide a way to designate some nodes as OEO nodes.

The MAXHOP parameters can be used to constrain the number of hops on a route and the Wx parameters are used as weights for different terms in the objective function.

```
==============
param NUMR ;                    # number of demand requirements
set R := 1..NUMR;
```

-continued

```
param RO {r in R};              # set of a requirements' originating
                                  end point
param RD {r in R};              # set of a requirements' destination
                                  end points
param WL {r in R};              # number of wavelength demand
                                  requirement (in lambda units)
param NUMVIA {n in NN};         # forcing routes via a switch for OEO
                                  functionality
param NUMVIACAP {n in NN};      # constraining total WLs via a switch
param MAXHOP ;                  # max number of hops allowed on
                                  route
param W1;                       # weights for terms in the objective
                                  function
param W2;
param W3;
param W4;
param W5;
==========
```

Variables

The x variables, when set to 1 by the program for route r and link 1, define the links that make the route. The auxiliary variables uu and vv will be used to force consistency of color along a route. The variable zz indicates the use of a color in the network. The variable via when set to 1 indicates that route r traverses node n. This will be explained later when describing the constraint sets and how it is being used.

```
==========
var x{l in L2, r in R}, binary;         # =1 if route r uses link l, 0
                                          otherwise
var uu{ r in R, l in L2, c in CC}, binary;  # color assignment variable
var vv{ r in R, c in CC}, binary;       # upper bound variable to
                                          force color consistency
Var zz{c in CC} >=0, integer;           # color use indicator
var via{n in NN, r in R} >=0;           # computed variable if =1
                                          then # route r traverses node n
==========
```

Constraints

The first three sets of constraints are structured to define routes. For each requested route r, the traditional set node flow-conservation equations with a balance of {+1, −1, 0} depending on whether the node is an originating one, terminating one or either flow-thru node or non-participating one for the route. This formulation alleviates the need to pre calculate large sets of potential routes.

The 4th set of constraints is based on the third set. The variable via[n,r] is computed and it takes a value of 1 if route r passes via node n, or is 0 otherwise. This variable can be used to force a route to use or avoid a set of particular nodes to be defined in the input data file.

The 5th and 6th sets of constraints force a minimum of NUMVIA[n] routes to pass thru node n not to exceed a total of NUMVIACAP[n] units of WLs.

An optional 7th set of constraints limits the total number of hops on each route, for example to no more than MAXHOP. Slight modifications of the 7th set of constraints can accommodate limits on route miles or maximum permitted latency for each demand (route). This constraint may be used to reflect technological limitations in the network.

```
================
subject to node_conserve1 {n in NN, r in R : n=RD[r]}:
    sum {l in L2, m in NN : n=LO[l] && m=LD[l]} x[l,r]
    − sum {l in L2, m in NN : n=LD[l] && m=LO[l]} x[l,r] = −1;
```

-continued

```
subject to node_conserve2 {n in NN, r in R : n=RO[r]}:
    sum {l in L2, m in NN : n=LO[l] && m=LD[l]} x[l,r]
    − sum {l in L2, m in NN : n=LD[l] && m=LO[l]} x[l,r] = 1;
subject to node_conserve3 {n in NN, r in R : n <> RO[r] && n <>
RD[r]}:
    sum {l in L2, m in NN : n=LO[l] && m=LD[l]} x[l,r]
    − sum {l in L2, m in NN : n=LD[l] && m=LO[l]} x[l,r] = 0 ;
subject to flowthru {n in NN, r in R : n <> RO[r] && n <> RD[r]}:
    sum {l in L2, m in NN : n=LO[l] && m=LD[l]} x[l,r]
    + sum {l in L2, m in NN : n=LD[l] && m=LO[l]} x[l,r] =
    2*via[n,r] ;
subject to total_via{n in NN}:
    sum {r in R} via[n,r] >= NUMVIA[n];
subject to node_via_cap{n in NN}:
    sum {r in R} via[n,r] * WL[r] <= NUMVIACAP[n];
subject to maxhop {r in R}:
    sum {l in L2} x[l,r] <= MAXHOP;
================
```

The following set of equations assures that capacity of each link is not exceeded. Notice that each demand is associated with a route and does not get split across routes. If splitting is allowed then each wavelength request is for one unit (WL[r]= 1) and the model still applies.

```
========================
# defined for nondirectional links
subject to capacity_cons {l in L}:
    sum {r in R} (x[l,r] +x[l+NUMLINKS,r])*WL[r] <= NUMCOLORS
========================
```

The set of inequalities that force contiguities of colors along the routes follows. The variable uu[r,l,c] is binary and assigns a specific color 'c' on link '1' when used by route 'r'. The first set of constraints, 'uu_color', assures proper distribution of colors for each channel in the demand set of route 'r'. The second set of constraints, 'vv_color', counts the number of colors that has been used up by different links on the same route. These variables uu[r,l,c] and vv[r,c] will be used in the objective function to force, if possible, an assignment of one color per route by associating a weight with vv[r,c]. Notice that when vv[r,c]=1, route 'r' is assigned color 'c'. When vv[r,c]=2, two colors are associated with route 'r', but the number of color changeovers at nodes on the route could be $\geq 1$. For example, a route with 5 links that have been assigned 2 colors (1 and 2) could have at most 4 changeovers (1, 2, 1, 2, 1).

```
========================
# forcing contiguous color
# distinct colors are assigned by uu[r,l,c]
# maintaining continuity of colors using vv[r,c]
# only one color can be assigned per link (forward and backwards
  direction
# counting the number of colors used in the network
subject to uu_color {l in L2, r in R}:
    x[l,r]*WL[r] = sum {c in CC} uu[r,l,c];
subject to vv_color { r in R, l in L2, c in CC}:
    uu[r,l,c] <= vv[r,c];
subject to wl_color { l in L , c in CC}:
    sum {r in R} (uu[r,l,c]+uu[r,l+NUMLINKS,c]) <=1;
subject to zz_color ( r in R, l in L, c in CC ):
    uu[r,l,c] <= zz[c];
========================
```

The last set of constraints indicates the use of a color 'c' and the variable zz[c] and its weight W5 may be used in the objective function to force a solution with a minimum number of colors in the network.

Objective Function

In the following objective function, the first summation represents the total wavelength miles. The second and third terms use penalties to minimize color changeovers on routes. The fourth term minimizes the number of nodes passed by the routes. The fifth term may be used to minimize color use in the network.

minimize color_cost:

$$\operatorname{sum}\left\{\begin{array}{l}r \text{ in } R, \\ 1 \text{ in } L\end{array}\right\} W1 * WL[r] * DIST[l] * \left(\begin{array}{l}x[1, r] + \\ x[1 + NUMLINKS, r]\end{array}\right) +$$

$$\operatorname{sum}\left\{\begin{array}{l}r \text{ in } R, \\ l \text{ in } L2, \\ c \text{ in } CC\end{array}\right\} W2 * uu[r, l, c] + \operatorname{sum}\left\{\begin{array}{l}r \text{ in } R, \\ c \text{ in } CC\end{array}\right\} W3 * vv[r, c] +$$

$$\operatorname{sum}\left\{\begin{array}{l}n \text{ in } NN, \\ r \text{ in } R\end{array}\right\} W4 * via[n, r] + \operatorname{sum}(c \text{ in } CC) W5 * zz[c];$$

Scalability

The model can grow very large in terms of the number of variables and constraints.

Number of Variables:

| | |
|---|---|
| x[l,r] | 2*L*R |
| uu[r,l,c] | R*2*L*C |
| vv[l,c] | 2*L*C |
| zz[c] | C |
| via[n,r] | N*R |

Number of Constraints:

| | |
|---|---|
| node_conserve | N*R |
| flowthru | N*R |
| total_via | N |
| total_via_cap | N |
| max_hop | R |
| uu_color | 2*L*R |
| vv_color | R*2*L*C |
| wl_color | L*C |
| zz_color | R*L*C |
| color_cost | 1 |

The model produced results quickly for a small sample network (such as the example of FIG. 1, where N=10, L=24, R=8 and C=4), with larger and more complex networks having longer run times.

Some additional measures may be required if the underlying network gets to be orders of magnitude larger, such as:
a) use of a faster multi-processing machine;
b) processing routing requests only off-line for planning purposes;
c) terminating a program run before optimality is proven by the branch and bound method; and
d) reverting to pure LP and integerize fractional variables with a post-processing heuristics.

The following describes two scenarios to improving the assignment of colors (wavelengths) on individual optical routes in accordance with aspects of the present invention.

Example 1

Optimization of the FIG. 1 Network

One example of optimization of color use in the network of FIG. 1 is presented in FIGS. 2-5. A listing of the AMPL model, Lambda.mod 200, is shown in FIG. 2. A listing of the data for the network of FIG. 1, Lambda.dat 300, including the demands for 8 routes, is shown in FIG. 3. A listing of a run script, Lambda.run 400, is shown in FIG. 4. An output file, Lambda.out 500, is shown in FIG. 5. This optimization was solved with virtually no delay in 1938 Mixed Integer Program (MIP) simplex iterations and 0 branch-and-bound nodes.

Figure 6:
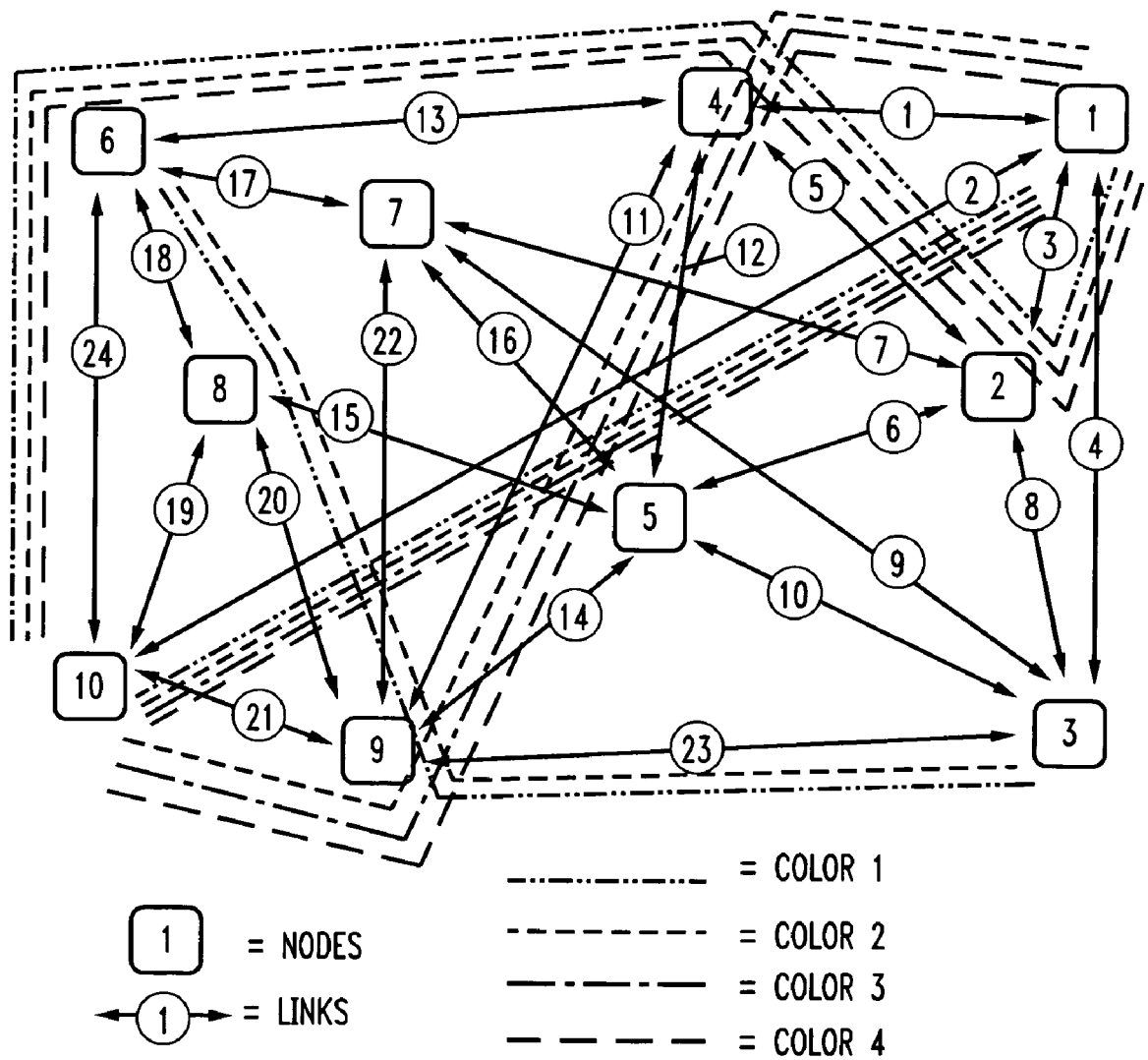
FIG. 6 shows a partial solution set for color assignment and routes for the exemplary AMPL model of FIG. 1 in accordance with the present invention.

The following is the output of a previous run that had no zz variables and no fifth term in the objective function. That run was solved with virtually no delay in 2075 MIP simplex iterations and 10 branch-and-bound nodes. FIG. 6 shows a partial color assignment solution set 600 for the exemplary AMPL model run.

For this optimization solution shown in FIG. 6, the demands are as follows:

| param: | RO | RD | WL := |
|---|---|---|---|
| 1 | 1 | 10 | 4 |
| 2 | 10 | 1 | 3 |
| 3 | 6 | 3 | 4 |
| 4 | 2 | 8 | 4 |
| 5 | 9 | 4 | 1 |
| 6 | 10 | 1 | 3 |
| 7 | 6 | 3 | 2 |
| 8 | 2 | 8 | 1 |
| ; | | | |

From the above table, demand number 1 from node 1 to node 10 is for 4 units and demand number 2 from node 10 to node 1 is for 3 units. Demand number 6 from node 10 to node 1 is for 3 units. These demands will follow 3 routes, link-capacities permitting.

For this optimization solution, the output matrix is as follows:

| vv[r,c] | [*,*] | | | | |
|---|---|---|---|---|---|
| : | 1 | 2 | 3 | 4 | := |
| 1 | 1 | 1 | 1 | 1 | |
| 2 | . | 1 | 1 | 1 | |
| 3 | 1 | 1 | 1 | 1 | |
| 4 | 1 | 1 | 1 | 1 | |
| 5 | 1 | . | . | . | |
| 6 | 1 | 1 | . | 1 | |
| 7 | 1 | 1 | . | . | |
| 8 | . | . | 1 | . | |
| ; | | | | | |

The output matrix indicates that demand number 1 for 4 units was assigned colors 1, 2, 3 and 4 on its route (no splitting assumption), and demand number 2 for 3 units was assigned colors 2, 3 and 4 on a separate route. Since no entry in this matrix is greater than 1, it is concluded that a solution was found without a need to switch colors in mid-route.

The following matrices indicate the assignment of colors on the links for each unit of WL by route.

| uu[r,l,c] | [*,*,1] | (tr) | | | | |
|---|---|---|---|---|---|---|
| : | 1 | 3 | 4 | 5 | 6 | 7 := |
| 2 | 1 | . | . | . | . | . |
| 6 | . | . | 1 | . | . | . |
| 15 | . | . | 1 | . | . | . |
| 17 | . | 1 | . | . | . | . |
| 18 | . | . | . | . | . | 1 |
| 23 | . | . | . | . | . | 1 |
| 27 | . | . | . | . | 1 | . |
| 29 | . | . | . | . | 1 | . |

-continued

|  | [*,*,2] | (tr) |  |  |  |  |
|---|---|---|---|---|---|---|
| 34 | . | 1 | . | . | . | . |
| 35 | . | . | . | 1 | . | . |
| 37 | . | . | . | . | 1 | . |
| 40 | . | 1 | . | . | . | . |
| 44 | . | . | . | . | . | 1 |
| 48 | . | . | . | . | 1 | . |

|  | [*,*,2] | (tr) |  |  |  |  |
|---|---|---|---|---|---|---|
| : | 1 | 2 | 3 | 4 | 6 | 7 := |
| 2 | 1 | . | . | . | . | . |
| 6 | . | . | . | 1 | . | . |
| 15 | . | . | . | 1 | . | . |
| 17 | . | . | 1 | . | . | . |
| 18 | . | . | . | . | . | 1 |
| 21 | . | 1 | . | . | . | . |
| 23 | . | . | . | . | . | 1 |
| 25 | . | 1 | . | . | . | . |
| 27 | . | . | . | . | 1 | . |
| 29 | . | . | . | . | 1 | . |
| 34 | . | . | 1 | . | . | . |
| 35 | . | 1 | . | . | . | . |
| 37 | . | . | . | . | 1 | . |
| 40 | . | . | 1 | . | . | . |
| 44 | . | . | . | . | . | 1 |
| 48 | . | . | . | . | 1 | . |

|  | [*,*,3] | (tr) |  |  |  |  |
|---|---|---|---|---|---|---|
| : | 1 | 2 | 3 | 4 | 8 | := |
| 2 | 1 | . | . | . | . |  |
| 5 | . | . | . | . | 1 |  |
| 6 | . | . | . | 1 | . |  |
| 13 | . | . | . | . | 1 |  |
| 15 | . | . | . | 1 | . |  |
| 17 | . | . | 1 | . | . |  |
| 18 | . | . | . | . | 1 |  |
| 21 | . | 1 | . | . | . |  |
| 25 | . | 1 | . | . | . |  |
| 34 | . | . | 1 | . | . |  |
| 35 | . | 1 | . | . | . |  |
| 40 | . | . | 1 | . | . |  |

|  | [*,*,4] | (tr) |  |  |  |  |
|---|---|---|---|---|---|---|
| : | 1 | 2 | 3 | 4 | 6 | := |
| 2 | 1 | . | . | . | . |  |
| 6 | . | . | . | 1 | . |  |
| 15 | . | . | . | 1 | . |  |
| 17 | . | . | 1 | . | . |  |
| 21 | . | 1 | . | . | . |  |
| 25 | . | 1 | . | . | . |  |
| 27 | . | . | . | . | 1 |  |
| 29 | . | . | . | . | 1 |  |
| 34 | . | . | 1 | . | . |  |
| 35 | . | 1 | . | . | . |  |
| 37 | . | . | . | . | 1 |  |
| 40 | . | . | 1 | . | . |  |
| 48 | . | . | . | . | 1 |  |
| ; |  |  |  |  |  |  |

Routes satisfying four of the eight demands are shown in FIG. 6. Link 2 was used for the first route and consumed all 4 colors for demand number 1 from node 1 to node 10. Colors 2, 3 and 4 were used for demand number 2 (of three units) on the route composed of links 21, 35 and 25 (that is 21, 11 and 1) from node 10 to node 1. Demand number 7 from node 6 to node 3 for two units was assigned colors 1 and 2 on the route composed of links 18, 44 and 23 (that is 18, 20 and 23). Demand number 6 again from node 10 to node 1 consumes colors 1, 2 and 4 on links 48, 37, 29, and 27 (24, 13, 5 and 3).

Figure 7:
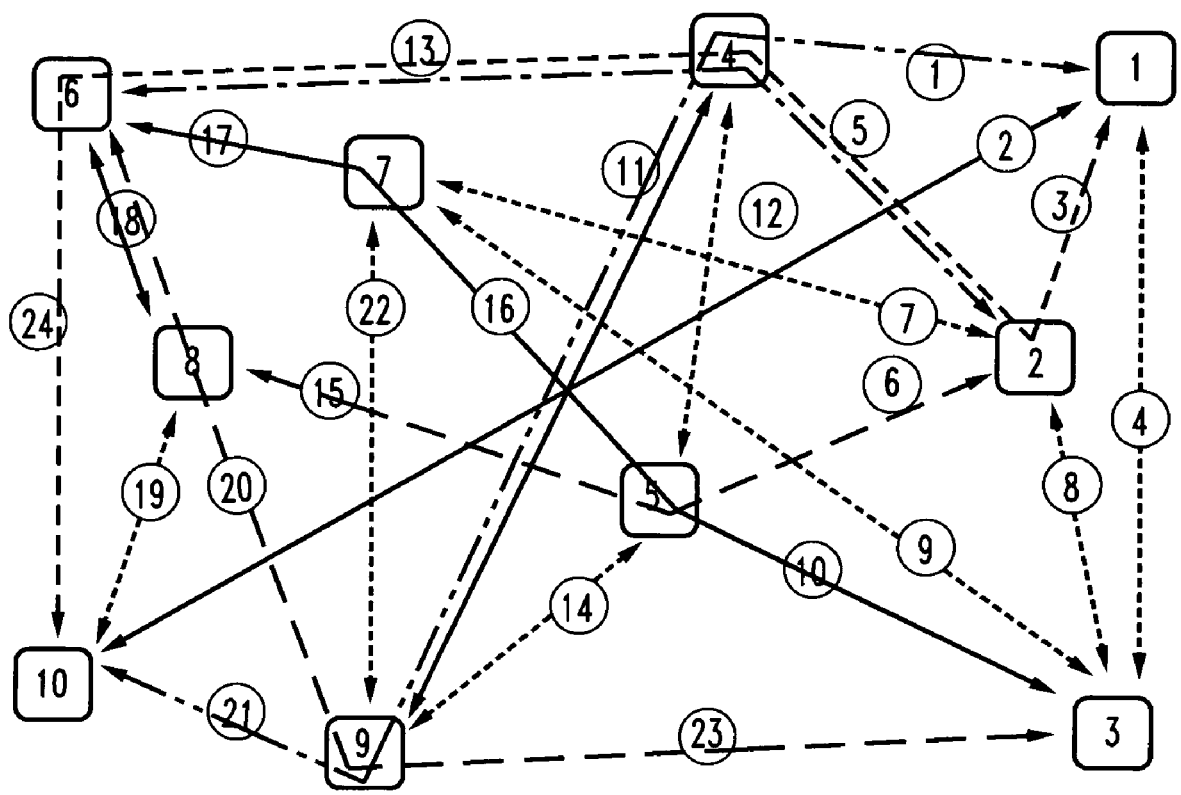
FIG. 7 shows the full solution set for routes only, without color assignment details, and unused links for the exemplary AMPL model of FIG. 1 in accordance with the present invention.

FIG. 7 shows the full solution set 700 for all eight demands for the exemplary AMPL model. The lines correspond to the routes only and not to the assignment of colors to WL's. The diagram of FIG. 7 explains what seems to be inefficient routing of demands 2, 6 and 7. Each route (demand) represents several WL's. There is clearly a mismatch between the demands and the link capacities. Longer routes may result from either lack of capacities or from the requirement for color contiguity of WL.

The matrix via[n,r]:

| via[n,r] | [*,*] |  |  |  |  |  |  |  |  |
|---|---|---|---|---|---|---|---|---|---|
| : | 1 | 2 | 3 | 4 | 5 | 6 | 7 | 8 | := |
| 1 | 0 | 0 | 0 | 0 | 0 | 0 | 0 | 0 |  |
| 2 | 0 | 0 | 0 | 0 | 0 | 1 | 0 | 0 |  |
| 3 | 0 | 0 | 0 | 0 | 0 | 0 | 0 | 0 |  |
| 4 | 0 | 1 | 0 | 0 | 0 | 1 | 0 | 1 |  |
| 5 | 0 | 0 | 1 | 1 | 0 | 0 | 0 | 0 |  |
| 6 | 0 | 0 | 0 | 0 | 0 | 1 | 0 | 1 |  |
| 7 | 0 | 0 | 1 | 0 | 0 | 0 | 0 | 0 |  |
| 8 | 0 | 0 | 0 | 0 | 0 | 0 | 1 | 0 |  |
| 9 | 0 | 1 | 0 | 0 | 0 | 0 | 1 | 0 |  |
| 10 | 0 | 0 | 0 | 0 | 0 | 0 | 0 | 0 |  |
| ; |  |  |  |  |  |  |  |  |  |

From the above matrix, demand number 1 is routed directly without via nodes. Demand number 2 passes via nodes 4 and 9; demand number 6 via nodes 2, 4 and 6; and demand number 7 passes via nodes 8 and 9. These four demands and corresponding individually assigned colors were illustrated in detail in FIG. 6.

Example 2

Forced Color Change-Over in Mid Route

Figure 8:
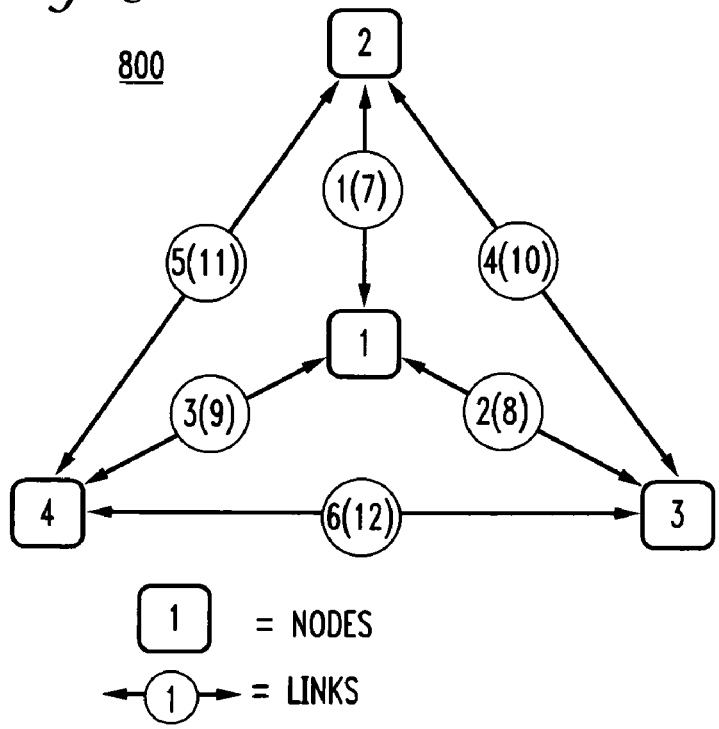
FIG. 8 shows an exemplary network to illustrate forced color change-over in mid route in accordance with an aspect of the present invention.
Figure 9:
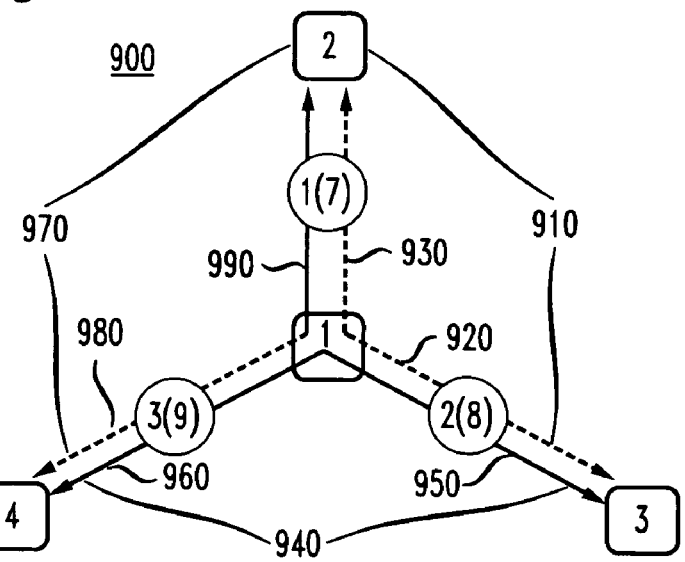
FIG. 9 shows the output of the AMPL model to optimize the network of FIG. 8 in accordance with the present invention.

To illustrate forced color changes on a route, a small example is presented in FIGS. 8 and 9. FIG. 8 shows an exemplary network 800 to illustrate forced color change-over in mid route in accordance with an aspect of the present invention. The exemplary network consists of 4 nodes, 6 bi-directional links, 3 demands for 1 unit of wavelength each, with every link able to accommodate 2 colors, as follows:

```
=======
param NUMNODES :=4;
param NUMLINKS :=3;
param :LO LD DIST:=
 1   1   2   100  ⎫
 2   1   3   100  ⎪
 3   1   4   100  ⎪
 4   2   3   140  ⎬ Forward
 5   2   4   140  ⎪
 6   3   4   140  ⎭
 7   2   1   100  ⎫
 8   3   1   100  ⎪
 9   4   1   100  ⎪
10   3   2   140  ⎬ Backward
11   4   2   140  ⎪
12   4   3   140  ⎭
param NUMCOLORS :=2;
param NUMR :=3
param : RO   RD   WL :=
 1    2    3    1
 2    2    4    1
 3    3    4    1;
param: NUMVIA NUMVIACAP:=
 1      3       3
 2      0       3
 3      0       3
 4      0       3
=======
```

The output of the model for example 2 is shown in FIG. 9, and shown below are matrices uu[r,l,c] and via[n,r].

| uu[r,l,c] := |  |  |  |
|---|---|---|---|
| 1 | 2 | 2 | 1 |
| 1 | 7 | 2 | 1 |

-continued

|   |   |   |   |
|---|---|---|---|
| 2 | 3 | 2 | 1 |
| 2 | 7 | 1 | 1 |
| 3 | 3 | 1 | 1 |
| 3 | 8 | 1 | 1 |
| via[n,r] := | | | |
| 1 | 1 | 1 | |
| 1 | 2 | 1 | |
| 1 | 3 | 1 | |
| 2 | 1 | 0 | |
| 2 | 2 | 0 | |
| 2 | 3 | 0 | |
| 3 | 1 | 0 | |
| 3 | 2 | 0 | |
| 3 | 3 | 0 | |
| 4 | 1 | 0 | |
| 4 | 2 | 0 | |
| 4 | 3 | 0 | |

The matrix uu[r,l,c] shows that demand route number 1 (element 910 of FIG. 9) was assigned color 2 on both link 2 920 and link 1 930. Demand route number 3 (element 940) was assigned color 1 on both link 2 950 and link 3 960. Lastly, demand route 2 970 was assigned color 2 on link 3 980 and color 1 on link 1 990. A color changeover was executed in node 1 for demand route 2 970. The output matrix via[n,r] shows that all three demands were forced via node 1 and nodes 2, 3 and 4 have no via routes.

Figure 10:
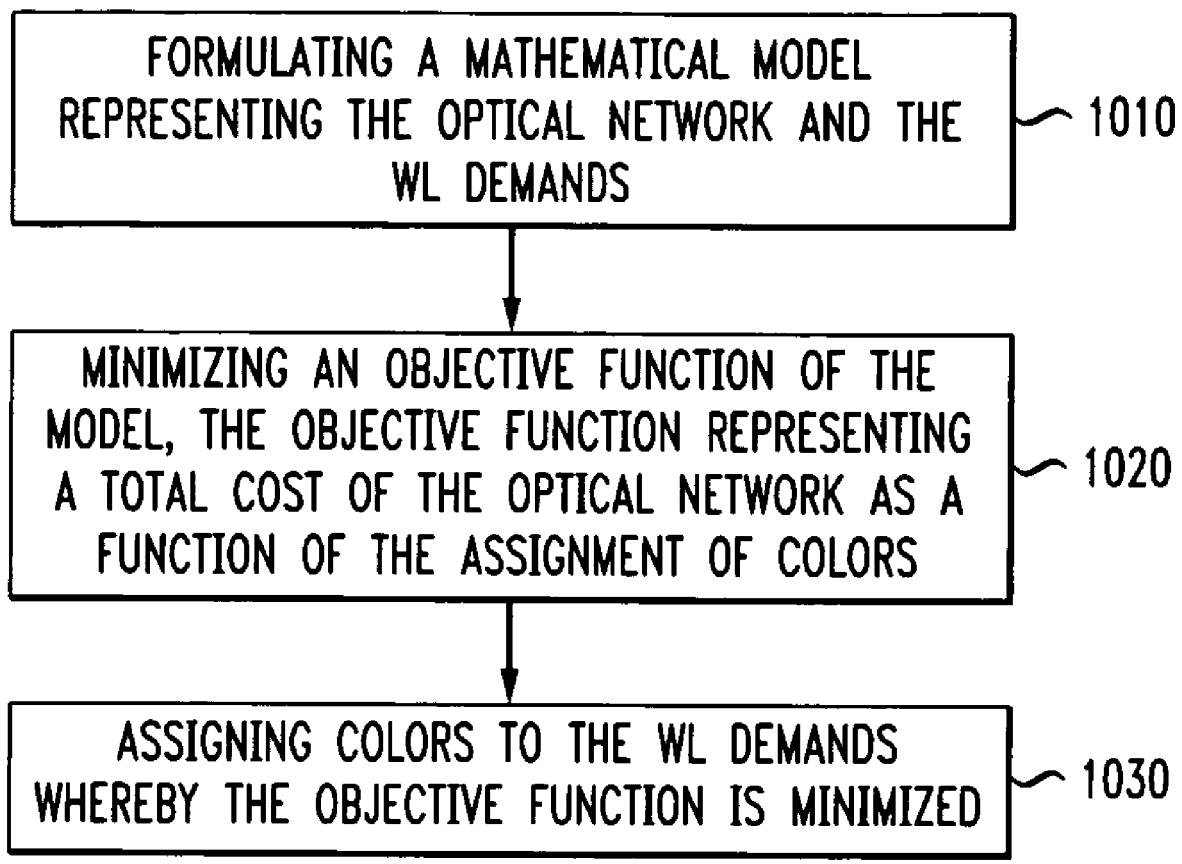
FIG. 10 is a flow diagram of an exemplary method in accordance with an aspect of the present invention.

FIG. 10 is a flow diagram of an exemplary method 1000 in accordance with one aspect of the present invention. In step 1010 a mathematical model is formulated representing the optical network and the WL demands;

An objective function of the model is then minimized (step 1020). The objective function represents a total cost of the optical network as a function of the assignment of color channels. In a preferred embodiment, the objective function includes a sum of at least the following quantities: a weighted summation of distances transmitted in each color channel in the network; a weighted count of each color in each link in each route, and a weighted count of each color in each route, whereby color changeovers on routes are penalized; and a weighted count of nodes traversed by each route, whereby routes with larger numbers of nodes are penalized.

Colors are assigned (step 1030) to the WL demands whereby the objective function is minimized.

Variants and Extensions

As mentioned earlier, the model is basic but may be extended in several directions. Assumptions are made, for example, that the channel units are fixed (e.g. OC48) but the model can be extended to DWDMs having link-dependent numbers of channels.

If a change in color is required, the model assumes it can take place in any node. With added complexity one can define two types of nodes: one type can provide changing of colors functionality and the other does not. The structure of the set of hop constraints can be used to set bounds on route mileage and a bound on latency.

Extensions already discussed include requirements that force routes to traverse designated OEO nodes or minimize total color usage in the network.

One benefit of the present invention is that the model minimizes the requirement for costly OEO devices when amplification suffices (within the limitation of distance). Furthermore, it provides for a structure so that additional extensions and enhancements could be added as needed or technology changes make possible or feasible. For example, one could 1) partition the nodes of a network into geographical clusters that assure that all intra-cluster routes satisfy the regeneration distance constraints, 2) select say 2 nodes (for reliability) from each such cluster as OEO nodes, 3) route all intra-cluster 'long' demands via the OEO nodes ignoring temporarily the color constraints 4) use the current model, a cluster at a time, to route the intra-cluster demands and the partial demands of the inter-cluster demands from their source nodes to the cluster's OEO node identified in (3), and 5) assign colors to all the leftover inter-cluster portions of the demands between their respective OEOs.

In the model of the present invention, all demands are given as input data while the output presents an optimal assignment of colors. This is a 'static' greenfield problem, as known by those skilled in the art. A 'dynamic" version of the problem assumes that an assignment is already in place and there are new requests for some additional demands. In a 'restoration' version of the problem a link or some WL's on a link fail, thus the routes fail. In the content of the model of the present invention, for the 'dynamic' and 'restoration' cases, one can fix the variables x[l,r] and uu[r,l,c] at value 1 for the routes that that stay up and re-solve the model for the disrupted, new demands or the once that can be rearranged.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for assigning colors to wavelength demands for transmitting multiple optical signals in an optical network between originating nodes and terminating nodes, the optical network comprising the originating nodes, the terminating nodes and a plurality of intermediate nodes interconnected by a plurality of links, the plurality of links each being capable of transmitting a respective predetermined maximum number of separate optical signals using separate colors, the method comprising:

formulating a mathematical model representing the optical network and the wavelength demands;

minimizing an objective function of the model, the objective function representing a total cost of the optical network as a function of an assignment of the colors, the objective function including a sum of at least the following quantities:

a weighted summation of distances transmitted in each color in the optical network;

a sum of all binary elements in a first matrix uu[r, l, c] wherein r represents individual routes used to meet the wavelength demands, l represents individual links included in a particular route, and c represents individual color channels used in particular links in particular routes, the sum of all binary elements in the first matrix uu[r, l, c] being weighted to favor fewer links per color channel in each route;

a sum of all elements in a second matrix vv[r, c] wherein each element represents a number of colors used in a color channel c in a route r, the sum of all elements in the second matrix vv[r, c] being weighted to force, when possible, a single color per color channel in each route; and a weighted count of nodes traversed by each route, whereby routes with larger numbers of nodes are penalized; and assigning the colors to the wavelength demands and identifying one or more of the intermediate nodes for color changeovers whereby the objective function is minimized.

2. The method of claim 1, wherein the objective function sum further includes:
a weighted count of the colors used in the network, whereby a number of colors used is minimized.

3. The method of claim 1, wherein the mathematical model comprises a forward link and a reverse link between pairs of the plurality of nodes.

4. The method of claim 1, wherein the mathematical model comprises a constraint set for defining the routes whereby a minimum number of the routes pass through any given node.

5. The method of claim 4, wherein the constraint set for defining the routes defines a maximum number of the routes passing through any given node.

6. The method of claim 4, wherein the constraint set for defining the routes defines a maximum number of hops in any given route.

7. The method of claim 1, wherein the mathematical model comprises a constraint set for assuring adequate link capacity whereby a minimum number of the routes pass through any given node.

8. The method of claim 1, wherein the predetermined maximum number of separate optical signals using separate colors is common for the plurality of links.

9. The method of claim 1, wherein the predetermined maximum number of separate optical signals using separate colors is different between at least two of the plurality of links.

10. The method of claim 1, wherein formulating a mathematical model representing the optical network and the wavelength demands further comprises designating certain of the plurality of nodes as optical cross connect devices having optical-electric-optical converters.

11. The method of claim 10, wherein the certain nodes designated as optical cross connect devices are designated by specifying, for those certain nodes, a minimum number of accommodated via routes and a maximum number of total colors accommodated as via capacity.

12. A computer-usable medium having computer readable instructions stored thereon for execution by a processor to perform a method for assigning colors to wavelength demands for transmitting multiple optical signals in an optical network between originating nodes and terminating nodes, the optical network comprising the originating nodes, the terminating nodes and a plurality of intermediate nodes interconnected by a plurality of links, the plurality of links each being capable of transmitting a respective predetermined maximum number of separate optical signals using separate colors, the method comprising:
formulating a mathematical model representing the optical network and the required routes;
minimizing an objective function of the model, the objective function representing a total cost of the optical network as a function of an assignment of color the colors, the objective function including a sum of at least the following quantities:
a weighted summation of distances transmitted in each color channel in the optical network;
a sum of all binary elements in a first matrix uu[r, l, c] wherein r represents individual routes used to meet the wavelength demands, l represents individual links included in a particular route, and c represents individual color channels used in particular links in particular routes, the sum of all binary elements in the first matrix uu[r, l, c] being weighted to favor fewer links per color channel in each route;
a sum of all elements in a second matrix vv[r, c] wherein each element represents a number of colors used in a color channel c in a route r, the sum of all elements in the second matrix vv[r, c] being weighted to force, when possible, a single color per color channel in each route; and
a weighted count of nodes traversed by each route, whereby routes with larger numbers of nodes are penalized; and
assigning the colors to the wavelength demands and identifying one or more of the intermediate nodes for color changeovers such that the objective function is minimized.

13. The computer useable medium of claim 12, wherein the objective function sum further includes:
a weighted count of the color channels used in the network, whereby a number of color channels used is minimized.

14. The computer useable medium of claim 12, wherein the mathematical model comprises a forward link and a reverse link between pairs of the plurality of nodes.

15. The computer useable medium of claim 12, wherein the mathematical model comprises a constraint set for defining the routes whereby a minimum number of routes the pass through any given node.

16. The computer useable medium of claim 15, wherein the constraint set for defining the routes defines a maximum number of the routes passing through any given node.

17. The computer useable medium of claim 12, wherein the mathematical model comprises a constraint set for assuring adequate link capacity whereby a minimum number of the routes pass through any given node.

18. The computer useable medium of claim 12, wherein the predetermined maximum number of separate optical signals on separate color channels is common for the plurality of links.

19. The computer useable medium of claim 12, wherein the predetermined maximum number of separate optical signals on separate color channels is different between at least two of the plurality of links.

* * * * *